(12) United States Patent
Dweib et al.

(10) Patent No.: US 11,549,633 B1
(45) Date of Patent: Jan. 10, 2023

(54) PROTECTING A PORTION OF A PIPELINE FROM AN IMPACT

(71) Applicant: Saudi Arabian Oil Company, Dhahran (SA)

(72) Inventors: Mahmoud A. Dweib, Dhahran (SA); Warren Peter Jacobs, Heathfield (ZA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/464,157

(22) Filed: Sep. 1, 2021

(51) Int. Cl.
*F16L 57/06* (2006.01)

(52) U.S. Cl.
CPC .................... *F16L 57/06* (2013.01)

(58) Field of Classification Search
CPC ........... F16L 57/06; F16L 58/181; F16L 11/12
USPC .......................... 138/110, 156–161
See application file for complete search history.

(56) References Cited

U.S. PATENT DOCUMENTS

| | | | | |
|---|---|---|---|---|
| 1,002,932 | A | * | 9/1911 | Richards .................. F16L 59/12 138/108 |
| 4,329,084 | A | | 5/1982 | Chapa |
| 4,530,478 | A | * | 7/1985 | McClellan ............ F16L 59/135 248/62 |
| 4,768,813 | A | * | 9/1988 | Timmons ................. F16L 21/06 285/133.11 |
| 4,808,031 | A | | 2/1989 | Baker |
| 4,830,060 | A | * | 5/1989 | Botsolas ............... F16L 59/161 138/158 |
| 4,902,215 | A | | 2/1990 | Seemann, III |
| 4,909,669 | A | | 3/1990 | Baker |
| 4,915,418 | A | * | 4/1990 | Palatchy ................. F16L 17/04 285/411 |
| 5,102,265 | A | | 4/1992 | Dokmo et al. |
| 5,269,568 | A | * | 12/1993 | Courturier ............ G09F 3/0323 285/423 |

(Continued)

FOREIGN PATENT DOCUMENTS

| | | |
|---|---|---|
| CN | 207147290 | 3/2018 |
| CN | 212407985 | 1/2021 |

(Continued)

OTHER PUBLICATIONS

Construction Safety Manual (CSM) vol. II, Oct. 2011, 500 pages.

(Continued)

*Primary Examiner* — Patrick F Brinson
(74) *Attorney, Agent, or Firm* — Fish & Richardson P.C.

(57) ABSTRACT

An assembly, a system, and a method for protecting a portion of a pipeline from an impact in an excavation operation creating a void around the portion of the pipeline with a shell assembly are described. The shell assembly includes two half cylinders and fasteners to couple the two half cylinders together. Each half cylinder has a pipe cover shell, an inner shell, and an outer shell. The pipe cover shell is sized to conform to an outer surface of the pipeline. The inner shell is spaced apart from the pipe cover shell and coupled to the pipe cover shell by radially extended inner supports. Each inner support has a crumple component that is weaker than adjacent portions of the inner support. The outer shell is spaced apart from the inner shell with the inner shell disposed between the outer shell and the pipe cover shell.

20 Claims, 4 Drawing Sheets

(56) References Cited

U.S. PATENT DOCUMENTS

| | | | |
|---|---|---|---|
| 5,348,044 A * | 9/1994 | Eugene | F16L 59/161 |
| | | | 285/55 |
| 5,490,742 A * | 2/1996 | Cronk | F16L 57/00 |
| | | | 405/157 |
| 5,736,672 A * | 4/1998 | Huang | H05K 9/0066 |
| | | | 174/391 |
| 6,308,491 B1 | 10/2001 | Porter | |
| 6,401,320 B1 * | 6/2002 | Lupke | B21C 37/154 |
| | | | 29/415 |
| 6,402,201 B1 | 6/2002 | Pool et al. | |
| 6,761,189 B2 * | 7/2004 | Berninger | B25J 19/0025 |
| | | | 138/104 |
| 7,049,251 B2 | 5/2006 | Porter | |
| 7,407,197 B2 | 8/2008 | Gronquist | |
| 7,520,535 B2 | 4/2009 | Gronquist | |
| 8,985,903 B1 | 3/2015 | Frith | |
| 9,005,396 B2 | 4/2015 | Baroux | |
| 9,194,120 B2 | 11/2015 | Pottelbergh et al. | |
| 9,200,458 B2 | 12/2015 | Harding | |
| 9,481,997 B2 | 11/2016 | Harding | |
| 9,671,068 B2 | 6/2017 | Zulfiquar | |
| 9,732,911 B2 | 8/2017 | Zulfiquar | |
| 9,976,798 B2 | 5/2018 | Mukherjee et al. | |
| 10,443,232 B2 | 10/2019 | Heiden | |
| 10,480,181 B1 | 11/2019 | Norris | |
| 10,544,587 B2 | 1/2020 | Ibrahim et al. | |
| 10,577,798 B1 | 3/2020 | Hodgson | |
| 10,920,909 B2 | 2/2021 | Connors | |
| 11,339,910 B1 * | 5/2022 | Brown | F16L 58/181 |
| 2003/0082361 A1 | 5/2003 | Jander | |
| 2007/0093158 A1 | 4/2007 | Dudt et al. | |
| 2008/0011381 A1 | 1/2008 | Squires | |
| 2013/0112694 A1 | 5/2013 | Bentley | |

FOREIGN PATENT DOCUMENTS

| | | |
|---|---|---|
| CN | 111237556 | 2/2021 |
| EP | 0546934 | 6/1993 |
| EP | 2273024 | 1/2011 |
| GB | 2398616 | 8/2004 |
| JP | 4492795 | 6/2010 |
| KR | 20180057246 | 5/2018 |

OTHER PUBLICATIONS

Engineering Standards, SAES-L-410 Paragraph 13.4, Apr. 2004, 39 pages.

Fisette, "Cellulose Insulation—A Smart Choice," Building and Construction Technology, Umass Amherst, Department of Environmental Conservation, 2005, 5 pages.

Inspectapedia.com [online], "Table of insulation Material R-Values R-Values of Various," available on or before Nov. 2019, retrieved on Aug. 21, 2020, retrieved from: URL <https://inspectapedia.com/insulation/Insulation-Values-Table.php>, 37 pages.

Wool, "Chapter 13: Hurricane-Resistant Houses from Soybean Oil and Natural Fibers," in Bio-Based Polymers and Composites, 2005, 35 pages.

PCT International Search Report and Written Opinion in International Appln. No. PCT/US2022/075225, dated Oct. 27, 2022.

* cited by examiner

PROTECTING A PORTION OF A PIPELINE FROM AN IMPACT

TECHNICAL FIELD

This disclosure relates to protecting a pipeline from an impact, in particular, by using a shell assembly.

BACKGROUND

Pipelines conduct fluids from one place to another place. Some pipelines are buried. In some cases, pipelines can cross above or below other pipelines. In order to place a new pipeline underneath and crossing an existing pipeline, the earth surrounding a portion of the existing pipeline can be excavated.

SUMMARY

This disclosure describes systems and methods related to protecting a portion of a pipeline from impact damage.

Pipelines can be made from either nonmetallic or metallic materials which, in some cases, can be brittle. Sometimes, during the excavation of the earth around an existing pipeline, the pipeline can be impacted by excavation equipment. The impact can damaged the pipeline and cause the fluids contained within the pipeline to leak out into the environment.

This approach protects a portion of a pipeline from an impact by a shell assembly. The shell assembly has two half cylinders and fasteners to couple the two half cylinders together. Each half cylinder includes a pipe cover shell, an inner shell, and an outer shell. The pipe cover shell is sized to conform to an outer surface of the pipeline. The inner shell is spaced apart from the pipe cover shell. The inner shell is coupled to the pipe cover shell by radially extended inner supports. Each inner support includes a crumple component that is weaker than adjacent portions of the inner support. The outer shell is spaced apart from the inner shell with the inner shell disposed between the outer shell and the pipe cover shell.

In one aspect, the shell assembly for protecting a portion of a pipeline from an impact, the shell assembly includes two half cylinders and fasteners to couple the two half cylinders together. Each half cylinder includes a pipe cover, an inner shell, and an outer shell. The pipe cover shell is sized to conform to an outer surface of the pipeline. The inner shell is spaced apart from the pipe cover shell. The inner shell is coupled to the pipe cover shell by radially extended inner supports. Each inner support has a crumple component that is weaker than adjacent portions of the inner support. The outer shell is spaced apart from the inner shell with the inner shell disposed between the outer shell and the pipe cover shell.

In some embodiments, the shell assembly further includes ribs coupling the outer shell to the inner shell.

In some embodiments, the shell assembly further includes a rubber padding positioned between the pipe cover shell and the pipeline.

In some embodiments, the shell assembly further includes a rubber padding positioned between the two half cylinders.

In some embodiments, the crumple component is further configured to crumple without transferring a load from inner shell to the pipe cover shell and the pipeline when the shell assembly receives the impact.

In some embodiments, the shell assembly further includes lifting lugs positioned on at least one of the half cylinders.

In some embodiments, a stiffness of the pipe cover shell, the inner shell, and the outer shell is greater than a stiffness of the crumple component.

In some embodiments, the shell assembly is constructed from at least one of steel, aluminum, an alloy, or a composite.

In some embodiments, the inner shell and the pipe cover shell define an annular volume. In some cases, the shell assembly further includes a foam positioned in the annular volume. In some cases, the shell assembly further includes a deformable metal web structure in the annular volume and the deformable metal structure couples the pipe shell cover to the inner shell.

In some embodiments, the pipe cover shell is spaced apart from the pipeline by a distance of 40 millimeters to 60 millimeters, the inner shell is spaced apart from the pipe cover shell by a distance of 250 millimeters to 300 millimeters, and the outer shell is spaced apart from the inner shell by a distance of 150 millimeters to 170 millimeters.

In another aspect, a system for protecting a portion of a pipeline from an impact includes a first protective zone, a second protective zone, and a third protective zone. The first protective zone defined by an outer shell and an inner shell. The second protective zone is defined by the inner shell and a pipe cover shell. The inner shell is spaced apart from the pipe cover shell. The inner shell is coupled to the pipe cover shell by radially extended inner supports. Each inner support has a crumple component that is weaker than adjacent portions of the inner support. The third protective zone is defined by the pipeline and the pipe cover shell. The pipe cover shell is sized to conform to an outer surface of the pipeline.

In some embodiments, the crumple component is further configured to crumple without transferring a load from inner shell to the pipe cover shell and the pipeline when the system receives the impact.

In some embodiments, a stiffness of the pipe cover shell, the inner shell, and the outer shell is greater than a stiffness of the crumple component.

In some embodiments, the system is further configured, when the portion of the pipeline receives the impact, the first protective zone deforms first, then the second protective zone deforms.

In some embodiments, the second protective zone includes an annular volume between the inner shell and the pipe cover shell.

In some embodiments, the system is structured as two half cylinders and multiple fasteners to couple the two half cylinders together. Each half cylinder includes a half of the pipe cover shell, a half of the inner shell, a half of the outer shell. Each half of the inner shell is spaced apart from the half of the pipe cover shell. Each half of the inner shell is coupled to the half of the pipe cover shell by radially extended inner supports. Each inner support has the crumple component that is weaker than adjacent portions of the inner support. Each half of the outer shell is spaced apart from the half of the inner shell with the half of the inner shell disposed between the half of the outer shell and the half of the pipe cover shell.

In another aspect, a method of protecting a pipeline in an excavation operation creating a void around a portion of the pipeline includes engaging a first half cylinder to a first portion of the pipeline in the void. The first half cylinder has a first half of a pipe cover shell, a first half of an inner shell, and a first half of an outer shell. The first half of the pipe cover shell is sized to conform to an outer surface of the pipeline. The first half of the inner shell spaced is apart from the first half of the pipe cover shell. The first half of the inner shell is coupled to the first half of the pipe cover shell by a first set of radially extended inner supports. Each inner support has a first crumple component that is weaker than adjacent portions of the inner support. The first half of an outer shell is spaced apart from the first half of the inner shell with the first half of the inner shell disposed between the first half of the outer shell and the first half of the pipe cover shell.

The method includes mating a second half cylinder to a second portion of the pipeline and the first half cylinder in the void. The second half cylinder has a second half of a pipe cover shell, a second half of an inner shell, and a second half of an outer shell. The second half of the pipe cover shell is sized to conform to an outer surface of the pipeline. The second half of the inner shell is spaced apart from the second half of the pipe cover shell. The second half of the inner shell is coupled to the second half of the pipe cover shell by a second set of radially extended inner supports. Each inner support has a second crumple component that is weaker than adjacent portions of the inner support. The second half of the outer shell is spaced apart from the second half of the inner shell with the second half of the inner shell disposed between the second half of the outer shell and the second half of the pipe cover shell.

In some embodiments, mating the second half cylinder to the first half cylinder comprises attaching fasteners to the second half cylinder and the first half cylinder.

Implementations of the present disclosure can realize one or more of the following advantages. These systems and methods can improve personnel and environmental safety. For example, protecting an existing pipeline from impact during the instillation of another pipeline can reduce the likelihood that the existing pipeline can be damaged. Reducing the likelihood of damage can maintain the structural integrity of the existing pipeline. When the pipeline becomes damaged from an impact, the contained fluids can be released to the environment, where the fluids can harm the environment and injure personnel. Protecting the pipeline can reduce the release of the contained fluids to the environment.

These systems and methods can reduce the time required to lay another pipeline below the existing pipeline. For example, protecting the existing pipeline with the shell assembly can allow the use of heavy excavation equipment to remove the soil (the earth) around and below the existing pipeline in order to place the other pipeline below the pipeline.

These systems and methods also can increase pipeline operational time. For example, when excavating the soil near the existing pipeline to place another pipeline under the pipeline, the flow of fluid through the pipeline does not need to be stopped and the existing pipeline drained before commencing work since the existing pipeline can be protected from impact by the excavation of the equipment by the shell assembly.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The present disclosure relates to protecting a portion of a pipeline from an impact by a shell assembly.

This approach protects the pipeline from the impact by placing the shell assembly around the existing pipeline. The shell assembly has two half cylinders and fasteners to couple the two half cylinders together. Each half cylinder includes a pipe cover shell, an inner shell, and an outer shell. The pipe cover shell is sized to conform to an outer surface of the pipeline. The inner shell is spaced apart from the pipe cover shell. The inner shell is coupled to the pipe cover shell by radially extended inner supports. Each inner support includes a crumple component that is weaker than adjacent portions of the inner support. The outer shell is spaced apart from the inner shell with the inner shell disposed between the outer shell and the pipe cover shell.

When laying a new pipeline, it may be necessary to place the new pipeline underneath an existing buried pipeline. Some pipelines are constructed from materials such as reinforced thermosetting resin which is brittle and can be damaged by impact. During the excavation of the soil around the existing pipeline, the pipeline can be damaged by an impact. For example, the impact can come from excavation equipment, jackhammers, falling rocks, or construction materials such as pipe or wood. Impact from these sources can cause the formation of micro-cracks, macro-cracks, or both. The cracks may not be visible, but can lead to pipe failure during future operation, for example, due to the undetected micro-cracks. In particular, pipelines made of brittle materials can be damaged by low speed, low force impacts.

Figure 1A:
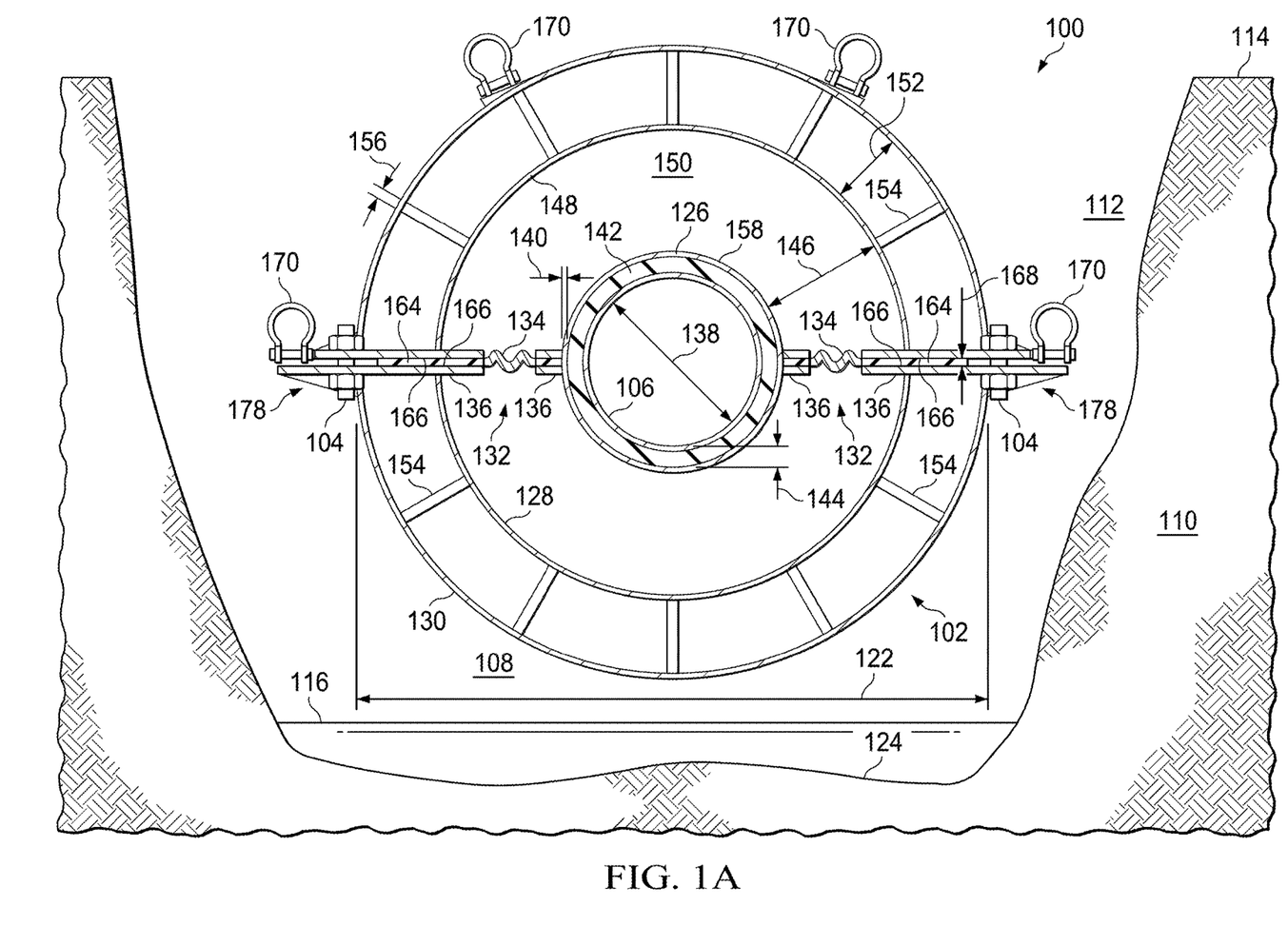
FIG. 1A is a cross-section view of a shell assembly for protecting a portion of a pipeline from an impact.
Figure 1B:
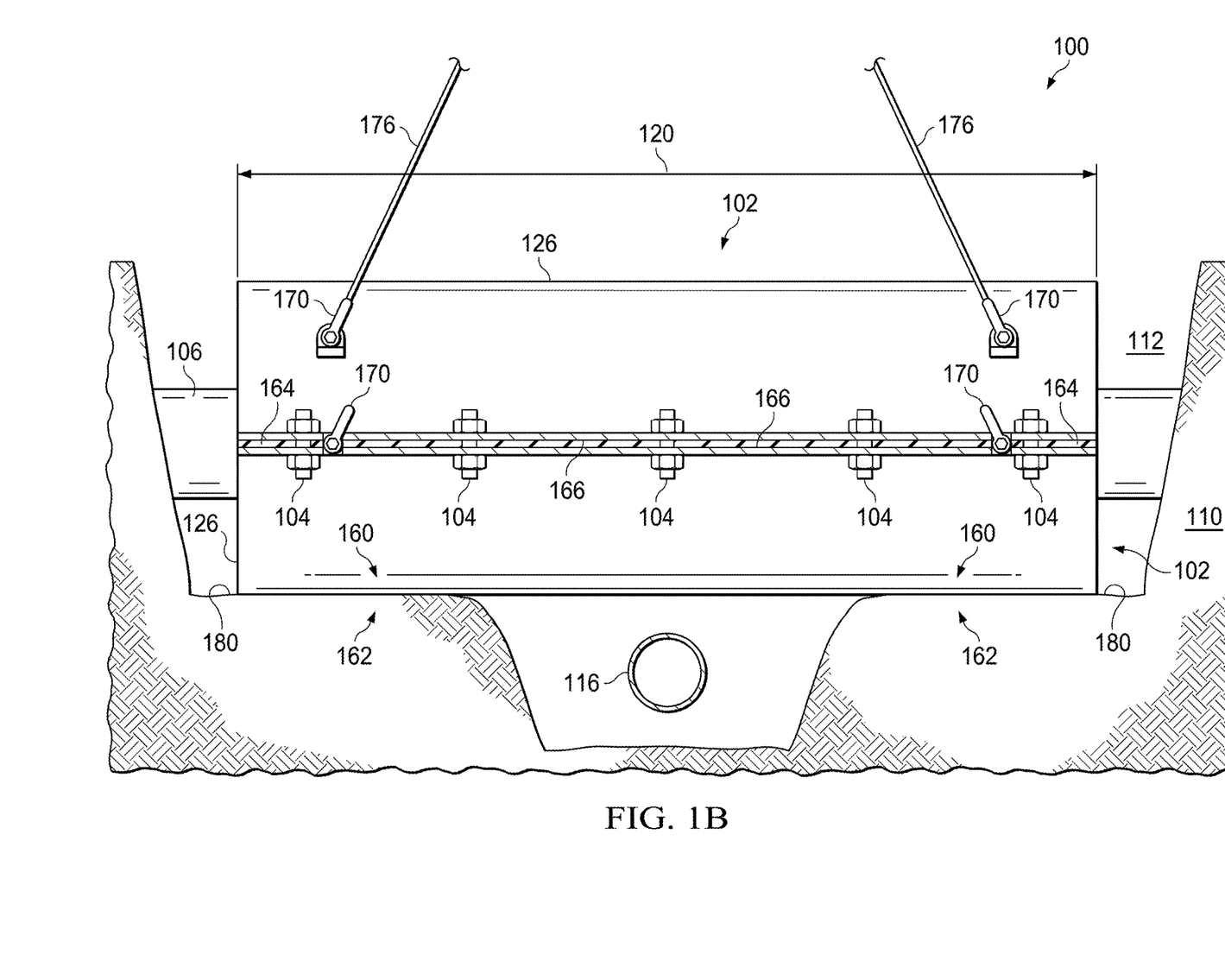
FIG. 1B is a side view of the shell assembly of FIG. 1A.
Figure 1C:
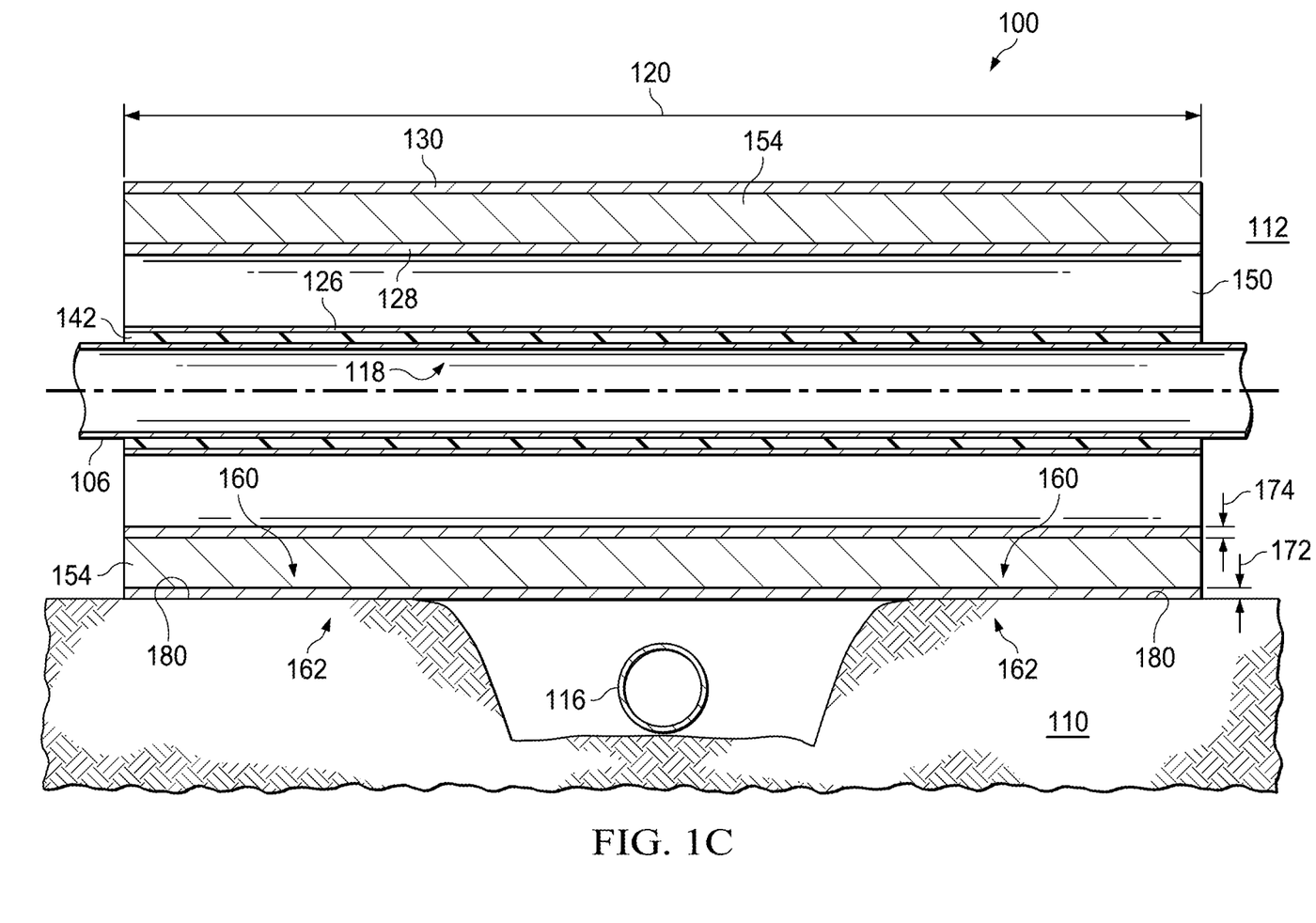
FIG. 1C is cross-section side view of the shell assembly of FIG. 1A.

FIGS. 1A-1C are schematic views of a shell assembly for protecting a portion of a pipeline from an impact. Referring to FIGS. 1A-1C, the shell assembly 100 has two half cylinders 102 and multiple fasteners 104 that couple the two half cylinders 102 together. The two half cylinders 102 are mated around a pipeline 106 to protect the pipeline 106 from an impact. The pipeline 106 is buried in soil 110 and can be impacted by excavation equipment (not shown) being used to remove a portion 108 of the soil 110 to form a trench 112 extending downward from a surface 114 of the soil 110. The portion 108 of the soil 110 is removed to create space for another pipeline 116 to be placed below the existing pipeline 106. The impacts, for example, contact with the excavation equipment or the new pipeline 116, can damage the existing pipeline 106.

The pipeline 106 can be nonmetallic or metallic. For example, nonmetallic pipelines include thermosetting resin-based pipelines 106 and reinforced thermosetting resin pipelines. For example, metallic pipelines include steel, aluminum, and alloy pipelines. The shell assembly 100 can also be used in non-pipeline applications. For example, the shell assembly 100 can be placed around a buried cable to protect the buried cable from impact during the excavation operation which could stretch, cut, or snap the buried cable.

Referring to FIG. 1A-1C, the shell assembly 100 protects a portion 118 (as shown in FIG. 1C) of the pipeline 106. The protected portion 118 corresponds to a length 120 of the shell assembly 100. The length 120 of the shell assembly 100 can be between 1.2 to 1.5 meters. The shell assembly 100 has an outer diameter 122. For example, the outer diameter 122 can be between 1 to 1.2 meters. The length 120 of the shell assembly 100 can be selected to protect the existing pipeline 106 based on an outer diameter 138 of the existing pipeline 106 and a depth 182 of the trench 112 from the surface 114.

Multiple shell assemblies 100 can be placed together on the pipeline 106 to protect additional portions 118 of the existing pipeline 106. In some cases, multiple shell assemblies 100 are coupled together to protect the additional portions 118 of the pipeline 106.

Each half cylinder 102 has a pipe cover shell 126, an inner shell 128, and an outer shell 130 which are coupled together and mated around the portion 118 of the pipeline 106 to be protected by the shell assembly 100. The pipe cover shell 126 is sized to conform to an outer surface 158 of the pipeline 106. The inner shell 128 is spaced apart from the pipe cover shell 126. The inner shell 128 is coupled to the pipe cover shell 126 by radially extended inner supports 132. Each inner support 132 includes a crumple component 134. The crumple component 134 is weaker than adjacent portions 136 of the inner support 132. The outer shell 130 is spaced apart from the inner shell 128 with the inner shell 128 disposed between the outer shell 130 and the pipe cover shell 126.

The pipe cover shell 126 conforms to the outer surface 158 of the pipeline 106. The pipeline 106 has an outer diameter 138 corresponding to the outer surface 158. The outer diameter 138 of the pipeline 106 can be between 4 and 24 inches. In the illustrated system, the outer diameter 138 is 8 inches. The pipe shell cover 126 can have a thickness 140. The thickness 140 of the pipe cover shell 126 can be between 6 and 8 millimeters. The pipe cover shell 126 can be steel, aluminum, an alloy, or a composite.

A rubber padding 142 can be positioned between the pipe cover shell 126 and the outer surface 158 of the pipeline 106. The rubber padding 142 is compressive so that it helps absorbs residual forces from impact not absorbed by the pipe cover shell 126, the inner shell 128, and the outer shell 130. The rubber padding 142 can have a thickness 144 which can be between 40 and 60 millimeter. The pipe cover shell 126 conforms to the pipeline 106 through the rubber padding. Not all installations include the rubber padding 42. The rubber padding 142 can be a polyurethane, a polyisoprene, a polybutadiene, a nitrile, or an ethylene propylene diene monomer rubber or a thermoplastic elastomer.

The inner shell 128 is spaced apart from the pipe cover shell 126 by a distance 146. The distance 146 is between 250 and 300 millimeters. Referring to FIG. 1C, the inner shell 128 has a thickness 172. The thickness 172 of the inner shell 128 can be between 8 and 10 millimeters. The outer shell 130 and the inner shell can be steel, aluminum, an alloy, a fiberglass, or a composite.

An inner surface 148 of the inner shell 128 and the outer surface 158 of the pipe cover shell 126 define an annular volume 150. The annular volume 150 can be empty, filled, or partially filled. For example, the annular volume 150 can be filled with a foam or a foam structure to deform without transferring the load to the pipeline 106. The foam can be a low density foam. A deformable metal web structure (not shown) can be placed in the annular volume 150 to couple the two half cylinders 102. The deformable metal web structure or foam/foam structure can further absorb forces from the impact to the shell assembly 100 and allow deformation, that is, crumple, without transferring load to the pipeline 106.

The inner shell 128 is coupled to the pipe cover shell 126 by the multiple radially extending inner supports 132. Each inner support 132 includes one or more crumple components 134. The crumple components 134 are weaker than adjacent portions 136 of the inner supports 132. The crumple components 134 can crumple without transferring a load, that is, the force of the impact, from the inner shell 128 to the pipe cover shell 126 along with the pipeline 106 when the shell assembly 100 receives the impact. The crumple component 134 can be a section of material connecting the two adjacent portions 136 of the inner supports 132. In some systems, the crumple component 134 is made of a similar material as the adjacent portions 136 of the inner supports 132 but has a smaller cross-section (e.g., is thinner) than the adjacent portions 136 of the inner supports 132. Alternatively or additionally, the crumple component 134 can be made of a weaker material than the two adjacent portions 136 of the inner supports 132. For example, the crumple component can be a metal such as steel or aluminum and the two adjacent portions 136 of the inner supports 132 can be a metal such as steel or aluminum. When the shell assembly 100 receives the impact, the crumple component 134 deforms because it is a weaker than the adjacent portions 136. The crumple component 134 is sufficiently weak so as to not transfer the load from the inner shell 128 to the pipe cover shell 126. The crumple component 134 will deform and not return to its original shape after it has been deformed by the impact. The crumple component 134 positions the inner shell 128 away from the pipe shell cover 126 but is weak enough to deform or crumple without transferring load to the pipeline 106 when impacted.

The outer shell 130 is spaced apart from the inner shell 128 with the inner shell 128 disposed between the outer shell 130 and the pipe cover shell 126. The outer shell 130 is spaced apart from the inner shell 128 by a distance 152. In the illustrated system, the distance 152 is between 150 and 170 millimeters. Referring to FIG. 1C, the outer shell 130 has a thickness 174. In the illustrated system, the thickness 174 of the outer shell 130 are between 8 and 10 millimeters. The outer shell 130 can be steel, aluminum, an alloy, or fiberglass. In some cases, a stiffness of the pipe cover shell 126, the inner shell 128, and the outer shell 130 is greater than a stiffness of the crumple component 134.

Multiple ribs 154 are coupled to the outer shell 130 and the inner shell 128 to space the outer shell 130 apart from the inner shell 128. The ribs 154 can have a thickness 156. In the illustrated system, the thickness 156 of the each of the ribs 154 are between 8 and 10 millimeters. The ribs 154 can extend the length 120 of the shell assembly 100. The ribs 154 can be solid, be multiple pieces, or have a lattice structure (not shown). The lattice structure can have a stiffness greater than or equal to a stiffness of the ribs 154. The ribs 154 can be steel, aluminum, an alloy, or a composite.

Referring to FIGS. 1B and 1C, portions 160 the outer shell 130 can rest on portions 162 of the soil 110 on a ledge 180 of the trench 112 so that the weight of the shell assembly 100 is supported by surrounding soil 110 rather than the existing pipeline 106. Alternatively or additionally, construction material such as a wood scaffolding (not shown) can be positioned between the shell assembly 100 and a floor 124 of the trench 112 to support the shell assembly 100. For example, the total weight of the shell assembly 100 can be up to or even exceed 500 kilograms. The total weight of the shell assembly 100 can depend on the outer diameter 138 of the pipeline 106 being protected and the various thicknesses and types of materials used for the shell assembly 100. For example, when large, heavy duty excavation equipment is used to remove the soil 110 in rocky areas, the shell assembly 100 can be predominately constructed of steel and the various components can be near or at their maximum dimensions.

Steel dowels (not shown) can be used to hold the shell assembly 100 in place in the trench 112. The steel dowels can be engaged to the shell assembly 100 to resist movement of the shell assembly 100 when the shell assembly 100 is impacted. Steel dowels can impede or stop the shell assembly 100 from sliding axially along the pipeline 106 when impacted axially or by a glancing impact. The outer shell 130 can have dowel voids to allow the steel dowels to pass through and engage the trench 112. The dowel voids can be positioned near the fasteners 104. The steel dowels can have an outer diameter between 20 to 30 mm diameter and a length of 1 meter.

Referring to FIGS. 1A-1B, another rubber padding 164 can be positioned between each half cylinder 102 on mating surfaces 166 where the two half cylinders 102 mate together. The rubber padding 164 can reduce friction between the two half cylinders 102. The rubber padding 164 has thickness 168 of between 9 and 11 millimeters.

The fasteners 104 couple the two half cylinders 102 of the shell assembly 100 together. The fasteners 104 can be studs and nuts, bolts and nuts, or latches. For example, in the illustrated system, five fasteners 104 are used on each side 178 to couple the two half cylinders 102 together, for a total of ten fasteners. The two half cylinders 102 are coupled together by the fasteners 104 to allow for easy assembly and disassembly when excavating the void 112 and placing the new pipeline 116. The fasteners 104 can allow the shell assembly 100 to be used multiple times to protect multiple portions 118 of pipelines 106 during different excavation operations.

The shell assembly 100 can include multiple lifting lugs 170 positioned on the outer shell 130. For example, in the illustrated system, lifting lugs 170 are positioned on each of the two half cylinders 102, that is, the lower and upper half cylinders 102. Construction equipment (not shown), such as a crane or a fork lift, including wire cables 176, can be coupled to the shell assembly 100 by the lifting lugs 170 to position the shell assembly 100 in the trench 112. For example, the rubber padding 142 is placed around the pipeline 106. The lifting lugs 170 positioned on the lower half cylinder 102 are used to place one half cylinder 102 in the trench 112 below the pipeline 106 and then engage the lower half cylinder 102 to the pipeline 106. The rubber padding 164 is placed on the mating, surfaces 166. The lifting lugs 170 positioned on the upper half cylinder 102 are used to place the upper half cylinder 102 in the trench 112 above the pipeline 106 and then engage the upper half cylinder 102 to the pipeline 106 through the rubber padding 164 and engage the upper half cylinder 102 to the lower half cylinder 102.

FIG. 1A illustrates the shell assembly 100 installed around a horizontal pipeline. In some implementations, the two half cylinders 102 are arranged around a vertical pipeline or an angled pipeline.

This system protects the portion 118 of the pipeline 106 from impact by including three protective zones defined by the components of the shell assembly 100 previously described. The three protective zones are a first protective zone, a second protective zone, and a third protective zone. In some cases, when an object impacts the shell assembly, the first protective zone deforms first, then the second protective zone deforms.

The first protective zone is defined by the outer shell 130 and the inner shell 128. The outer shell 130 is spaced apart from and coupled to the inner shell 128 by the ribs 154.

The second protective zone is defined by the inner shell 128 and a pipe cover shell 126. The inner shell 128 is spaced apart from the pipe cover shell 126. The inner shell 128 is coupled to the pipe cover shell 126 by the radially extended inner supports 132. Each inner support 132 includes the crumple component 134 that is weaker than the adjacent portions 136 of the inner support 132. The crumple component 134 can crumple without transferring the load from inner shell 128 to the pipe cover shell 126 and the pipeline 106 when the system receives the impact. The stiffness's of the pipe cover shell 126, the inner shell 128, and the outer shell 130 are typically greater than the stiffness of the crumple component 134. The second protective zone can have the annular volume 150 between the inner shell 128 and the pipe cover shell 126. The annular volume 150 can be filled with the deformable metal web structure or the foam.

The third protective zone is defined by the pipeline 106 and the pipe cover shell 126. The pipe cover shell 126 is sized to conform to the outer surface 158 of the pipeline 106. The third protective zone can be filled with the rubber padding 142.

In some cases, the system of three protective zones is structured as the two half cylinders 102. Each half cylinder 102 includes a half of the pipe cover shell 126, a half of the inner shell 128, a half of the outer shell 130, and fasteners 104 to couple the two half cylinders 102 together.

In some cases, the system can be structured as one half cylinder 102 and two quarter cylinders (not shown). For example, the lower half cylinder 102 can have two quarter cylinders, each coupled to the upper half cylinder and each other by the fasteners 104 when placed in the trench 112. For example, the upper half cylinder 102 can have two quarter cylinders, each coupled to the lower half cylinder and each other by the fasteners 104 when placed in the trench 112. In some cases, each of the two quarter cylinders can be coupled to the half cylinder by a hinge (not shown), then coupled to each other by the fasteners 104. In other cases, the shell assembly 100 has four quarter cylinders. Using four quarter cylinders can improve shipping and handling of the system when the system is configured for protecting large diameter pipelines 106.

The half of the inner shell 128 is spaced apart from the half of the pipe cover shell 126. The half of the inner shell 128 is coupled to the half of the pipe cover shell 126 by the radially extended inner supports 132. Each inner support 132 includes the crumple component 134 that is weaker than adjacent portions 136 of the inner support 132. The half of the outer shell 130 is spaced apart from the half of the inner shell 128 with the half of the inner shell 128 disposed between the half of the outer shell 130 and the half of the pipe cover shell 126.

Figure 2:
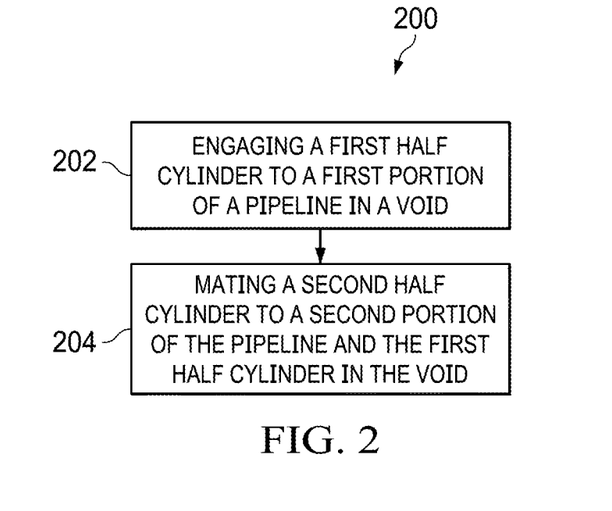
FIG. 2 is a flow chart of an example method of protecting a portion of a pipeline from an impact with a shell assembly.

FIG. 2 is a flow chart 200 of an example method of protecting a pipeline in an excavation operation creating a void around a portion of the pipeline according to the implementations of the present disclosure. At 202, a first half cylinder is engaged to a first portion of the pipeline in the void. The first half cylinder has a first half of a pipe cover shell sized to conform to an outer surface of the pipeline. The first half cylinder has a first half of an inner shell spaced apart from the first half of the pipe cover shell. The first half of the inner shell is coupled to the first half of the pipe cover shell by a first set of radially extended inner supports. Each inner support has a first crumple component that is weaker than adjacent portions of the inner support. The first half cylinder has a first half of an outer shell spaced apart from the first half of the inner shell with the first half of the inner shell disposed between the first half of the outer shell and the first half of the pipe cover shell. Referring to FIGS. 1A-1C, in some cases, before engaging the lower half cylinder 102 to the pipeline 106, the rubber padding 142 is placed around the pipeline 106. The lower half cylinder 102 is placed in the trench 112 by positioning the lower half cylinder 102 by the lifting lugs 170 attached to a wire cable 176.

At 204, a second half cylinder is mated to a second portion of the pipeline and the first half cylinder in the void. The second half cylinder has a second half of a pipe cover shell sized to conform to an outer surface of the pipeline. The second half cylinder has a second half of an inner shell spaced apart from the second half of the pipe cover shell. The second half of the inner shell is coupled to the second half of the pipe cover shell by a second set of radially extended inner supports. Each inner support has a second crumple component that is weaker than adjacent portions of the inner support. The second half cylinder has a second half of an outer shell spaced apart from the second half of the inner shell with the second half of the inner shell disposed between the second half of the outer shell and the second half of the pipe cover shell. Referring to FIGS. 1A-1B, the rubber padding 164 can be placed on top of the lower half cylinder 102. The upper half cylinder 102 is placed in the trench 112 by positioning the upper half cylinder 102 by the lifting lugs 170 attached to a wire cable 176. The upper half cylinder 102 is mated to the lower half cylinder 102 at the mating surfaces 166.

Mating the second half cylinder to the first half cylinder can include attaching fasteners to the second half cylinder and the first half cylinder. Referring to FIGS. 1A-1B, the fasteners 104 can be studs and nuts to couple the two half cylinders 102 together.

Although the following detailed description contains many specific details for purposes of illustration, it is understood that one of ordinary skill in the art will appreciate that many examples, variations, and alterations to the following details are within the scope and spirit of the disclosure. Accordingly, the example implementations described herein and provided in the appended figures are set forth without any loss of generality, and without imposing limitations on the claimed implementations.

Although the present implementations have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The invention claimed is:

1. A shell assembly for protecting a portion of a pipeline from an impact, the shell assembly comprising:
two half cylinders, each half cylinder comprising:
a pipe cover shell sized to conform to an outer surface of the pipeline;
an inner shell spaced apart from the pipe cover shell, the inner shell coupled to the pipe cover shell by a plurality of radially extended inner supports, each inner support including a crumple component that is weaker than adjacent portions of the inner support; and
an outer shell spaced apart from the inner shell with the inner shell disposed between the outer shell and the pipe cover shell; and
a plurality of fasteners to couple the two half cylinders together.

2. The shell assembly of claim 1, further comprising a plurality of ribs coupling the outer shell to the inner shell.

3. The shell assembly of claim 1, further comprising a rubber padding positioned between the pipe cover shell and the pipeline.

4. The shell assembly of claim 1, further comprising a rubber padding positioned between the two half cylinders.

5. The shell assembly of claim 1, wherein the crumple component is further configured to crumple without transferring a load from inner shell to the pipe cover shell and the pipeline when the shell assembly receives the impact.

6. The shell assembly of claim 1, further comprising a plurality of lifting lugs positioned on at least one of the half cylinders.

7. The shell assembly of claim 1, wherein a stiffness of the pipe cover shell, the inner shell, and the outer shell is greater than a stiffness of the crumple component.

8. The shell assembly of claim 1, wherein the shell assembly is constructed from at least one of steel, aluminum, an alloy, or a composite.

9. The shell assembly of claim 1, wherein the inner shell and the pipe cover shell define an annular volume.

10. The shell assembly of claim 9, further comprising a foam positioned in the annular volume.

11. The shell assembly of claim 9, further comprising a deformable metal web structure in the annular volume, the deformable metal structure configured to couple the pipe shell cover to the inner shell.

12. The shell assembly of claim 1, wherein:
the pipe cover shell is spaced apart from the pipeline by a distance of 40 millimeters to 60 millimeters;
the inner shell is spaced apart from the pipe cover shell by a distance of 250 millimeters to 300 millimeters; and
the outer shell is spaced apart from the inner shell by a distance of 150 millimeters to 170 millimeters.

13. A system for protecting a portion of a pipeline from an impact comprising:
a first protective zone defined by an outer shell and an inner shell;
a second protective zone defined by the inner shell and a pipe cover shell, the inner shell spaced apart from the pipe cover shell, the inner shell coupled to the pipe cover shell by a plurality of radially extended inner supports, each inner support including a crumple component that is weaker than adjacent portions of the inner support; and
a third protective zone defined by the pipeline and the pipe cover shell, the pipe cover shell sized to conform to an outer surface of the pipeline.

14. The system of claim 13, wherein the crumple component is further configured to crumple without transferring a load from inner shell to the pipe cover shell and the pipeline when the system receives the impact.

15. The system of claim 13, wherein a stiffness of the pipe cover shell, the inner shell, and the outer shell is greater than a stiffness of the crumple component.

16. The system of claim 13, wherein the system is further configured, when the portion of the pipeline receives the impact, the first protective zone deforms first, then the second protective zone deforms.

17. The system of claim 13, wherein, the second protective zone comprises an annular volume between the inner shell and the pipe cover shell.

18. The system of claim 13, structured as two half cylinders, each half cylinder comprising:
- a half of the pipe cover shell;
- a half of the inner shell spaced apart from the half of the pipe cover shell, the half of the inner shell coupled to the half of the pipe cover shell by the plurality of radially extended inner supports, each inner support including the crumple component that is weaker than adjacent portions of the inner support; and
- a half of the outer shell spaced apart from the half of the inner shell with the half of the inner shell disposed between the half of the outer shell and the half of the pipe cover shell; and
- a plurality of fasteners to couple the two half cylinders together.

19. A method of protecting a pipeline in an excavation operation creating a void around a portion of the pipeline, the method comprising:
- engaging a first half cylinder to a first portion of the pipeline in the void, the first half cylinder comprising:
  - a first half of a pipe cover shell sized to conform to an outer surface of the pipeline;
  - a first half of an inner shell spaced apart from the first half of the pipe cover shell, the first half of the inner shell coupled to the first half of the pipe cover shell by a first plurality of radially extended inner supports, each inner support including a first crumple component that is weaker than adjacent portions of the inner support; and
  - a first half of an outer shell spaced apart from the first half of the inner shell with the first half of the inner shell disposed between the first half of the outer shell and the first half of the pipe cover shell; and
- mating a second half cylinder to a second portion of the pipeline and the first half cylinder in the void, the second half cylinder comprising:
  - a second half of a pipe cover shell sized to conform to an outer surface of the pipeline;
  - a second half of an inner shell spaced apart from the second half of the pipe cover shell, the second half of the inner shell coupled to the second half of the pipe cover shell by a second plurality of radially extended inner supports, each inner support including a second crumple component that is weaker than adjacent portions of the inner support; and
  - a second half of an outer shell spaced apart from the second half of the inner shell with the second half of the inner shell disposed between the second half of the outer shell and the second half of the pipe cover shell.

20. The method of claim 19, wherein mating the second half cylinder to the first half cylinder comprises attaching a plurality of fasteners to the second half cylinder and the first half cylinder.

* * * * *